(12) United States Patent
Flambert et al.

(10) Patent No.: US 6,412,517 B1
(45) Date of Patent: Jul. 2, 2002

(54) PUMP DEVICE FOR A GAS OIL TANK OF A MOTOR VEHICLE

(75) Inventors: Will Flambert, Chalons en Champagne; Jean Filjak, Epinay sur Seine, both of (FR)

(73) Assignee: Marwal Systems (FR)

( * ) Notice: Subject to any disclaimer, the term of this patent is extended or adjusted under 35 U.S.C. 154(b) by 0 days.

(21) Appl. No.: 09/509,574
(22) PCT Filed: Sep. 22, 1998
(86) PCT No.: PCT/FR98/02019
§ 371 (c)(1),
(2), (4) Date: Jul. 18, 2000
(87) PCT Pub. No.: WO99/15777
PCT Pub. Date: Apr. 1, 1999

(30) Foreign Application Priority Data

Sep. 25, 1997 (FR) .............................. 97 11950

(51) Int. Cl.$^7$ .............................................. F02M 37/22
(52) U.S. Cl. ................... 137/550; 137/565.34; 123/510
(58) Field of Search ....................... 137/565.01, 565.34, 137/565.22, 590, 549, 550; 123/509, 510, 198 D; 210/416.4, 416.5, 167, 168

(56) References Cited

U.S. PATENT DOCUMENTS

| 1,568,796 A | * | 1/1926 | Breer | .......................... 210/130 |
| 3,773,144 A | * | 11/1973 | Hummel | ............. 123/196 A X |
| 4,129,503 A | * | 12/1978 | Joseph | .................... 137/590 X |
| 4,312,753 A | * | 1/1982 | Bell | ..................... 210/416.4 X |
| 4,561,977 A | * | 12/1985 | Sasaki | ................. 210/416.4 X |
| 4,747,378 A | * | 5/1988 | Angelo | .................... 210/168 X |
| 4,922,959 A | * | 5/1990 | Sasaki et al. | ........... 137/590 X |
| 5,049,271 A | * | 9/1991 | Cain | .................... 210/416.4 X |
| 5,084,166 A | * | 1/1992 | Shiraga et al. | ....... 210/416.4 X |
| 5,085,768 A | * | 2/1992 | Murakami et al. | ... 210/416.4 X |
| 5,120,434 A | * | 6/1992 | Yoshida | ............... 210/416.4 X |
| 5,130,014 A | * | 7/1992 | Volz | .................... 123/198 E X |
| 5,584,988 A | * | 12/1996 | Hashimoto et al. | .. 210/416.4 X |
| 5,924,445 A | * | 7/1999 | Ambrose et al. | ........... 137/549 |

FOREIGN PATENT DOCUMENTS

| EP | 0578484 | * | 1/1994 |
| EP | 0661440 | * | 7/1995 |
| GB | 2253160 | * | 9/1991 |

OTHER PUBLICATIONS

"Automotive Fuel Filtratin Trends", Automotive Engineering, vol. 99, No. 9, Warrendale, PA., Sep. 1991.*

* cited by examiner

Primary Examiner—John Rivell
(74) Attorney, Agent, or Firm—Blakely Sokoloff Taylor & Zafman

(57) ABSTRACT

The present invention relates to a pump device for a gas oil tank of a motor vehicle, the device comprising a pump (10) and a filtering strainer (20) placed at the intake of the pump (10), and being characterized by the fact that it includes a valve (100) disposed in a passage (22) formed through the strainer (20) so as to close said passage (22) in normal operation, the valve (100) being adapted to open automatically when the pressure difference between the outside of the strainer (20) and the inside thereof exceeds a threshold because of the strainer (20) becoming clogged.

17 Claims, 4 Drawing Sheets

PUMP DEVICE FOR A GAS OIL TANK OF A MOTOR VEHICLE

The present invention relates to the field of pump devices for pumping fuel from a motor vehicle tank.

More precisely, the present invention relates to the field of devices for pumping gas oil.

Numerous pump devices have already been proposed for this purpose.

As shown diagrammatically in accompanying FIG. 1, most pump devices proposed in this way comprise an electric pump 10 whose intake is provided with a filter or "strainer" 20. The function of the filter is to protect the pump 10 from contamination that could clog it or give rise to other damage. Typically, but in non-limiting manner, the mesh size of the filter 20 is about 70 μm. The intake of the pump 10 and the strainer can be situated directly in the main fuel tank, close to the bottom thereof, or in a reserve which is itself placed close to the bottom of the main tank and which is, for example, fed by an outlet stage from the pump or by the returned fuel that is not used by the engine.

It is known that below some specific temperature, gas oil tends to produce particles of paraffin wax.

Thus, in cold weather, and at least when starting, the gas oil can clog the filter 20 with wax, thereby preventing the pump 10 from being fed and consequently paralyzing the vehicle.

In an attempt to eliminate that major drawback, proposals have been made to increase the mesh size of the filter 20 so as to reduce the risk of it clogging, e.g. by using a filter 20 having a mesh with a mean dimension of about 200 μm. Nevertheless, that proposal does not always give satisfaction, since the pump 10 is not always fully protected when using such a large-mesh filter.

Thus, at present, most fuel feed systems that use gas oil are fitted with means suitable for heating the gas oil so as to avoid clogging the fine filter that protects the high pressure pump.

However, practical implementation of that concept gives rise to difficulties. These difficulties are due in particular to the fact that the composition of gas oils made available to users can vary from one supplier to another and above all from one country to another, given that requirements concerning additives and/or refining are still not subject to international standardization.

As a result, the reference temperature at which it is desirable to put the above-mentioned heater means into operation can depend on the composition of the gas oil contained in the tank, and more commonly on the country in which the tank was filled. By way of example, this temperature is typically about −30° C. to −40° C. in Sweden and about 0° C. in Africa.

Attempts have already been made to solve this problem by proposing an adjustable thermostat for triggering the heater means.

However that solution does not give complete satisfaction. Firstly it is difficult to adjust such a thermostat. Secondly, and above all, that solution theoretically requires the thermostat to be reset with each change in the composition of the gas oil put into the tank.

In addition, such heater means consume a non-negligible quantity of electrical power if they are powered continuously independently of temperature.

Document EP-A-661440 describes a fuel pump device comprising two filters associated with a pump intake. The first filter-forming strainer is placed in a main tank. The second filter is placed in a reserve bowl. The outlets from the two filters are connected to a common suction chamber by means of ducts. In addition, the second filter is fitted with a valve constituted by a seat associated with a shutter member. In the event of the two filters becoming clogged, the resulting suction causes the valve to open so that the pump sucks directly into the bowl.

The COMBEST document "Automotive fuel filtration trends", Automotive engineering, vol. 99, no. 9, September 1991, describes various fuel filter structures.

Documents U.S. Pat. No. 3,773,144, U.S. Pat. No. 4,129,503, and U.S. Pat. No. 1,568,796 describe suction systems for tanks comprising a filter fitted with a valve adapted to be opened in the event of the filter becoming clogged.

The present invention now has the object of proposing novel pump means for gas oil that enable the above-specified drawbacks to be eliminated.

In the context of the present invention, this object is achieved by means of a gas oil pump device comprising a pump, a filtering strainer placed at the intake of the pump, and a valve disposed in a passage formed through the strainer so as to cover said passage in normal operation, the valve being adapted to open automatically when the pressure difference between the outside of the strainer and the inside thereof exceeds a threshold because of the strainer becoming clogged, the device being characterized in that the seat of the valve is angular and projects into the inside of the cage of the valve.

As explained below, the valve is preferably constituted by a fuel-proof flap. Thus, it closes the passage formed through the strainer when in the closed position. However, in a variant, the valve can be formed at least in part by a filter element possessing a mesh size equal to that of the strainer, for example.

The strainer preferably has a mesh size of about 70 μm.

The valve is preferably protected by an auxiliary filter having a larger mesh size, e.g. about 200 μm to 300 μm. However, in a variant, the auxiliary filter can be placed at the intake of the pump and not upstream from the valve.

The present invention also provides a fuel tank fitted in this way.

Other characteristics, objects, and advantages of the present invention will appear on reading the following detailed description given by way of non-limiting example and with reference to the accompanying drawings, in which:

FIG. 1, described above, is a diagrammatic view of a conventional pump. assembly, forming part of the prior art;

The general structure of the pump assembly of the present invention, and in particular the structure of the tank, the reserve if any, the pump, and the strainer is conventional per se and is therefore not described in detail below.

The description below relates solely to the characteristics that are specific to the invention.

Figure 1:
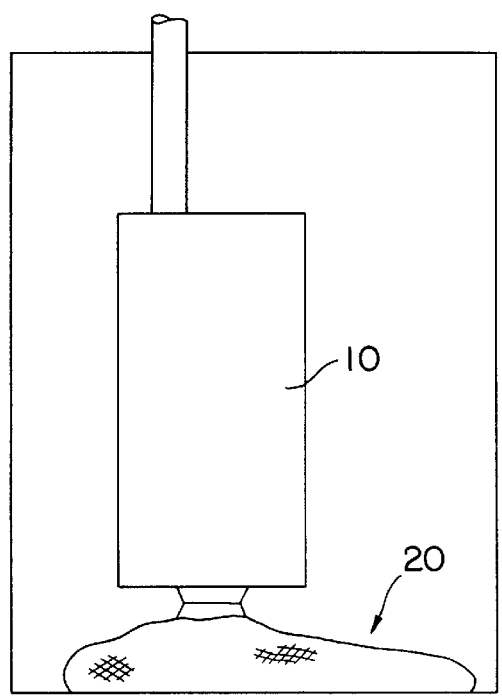
Figure 2:
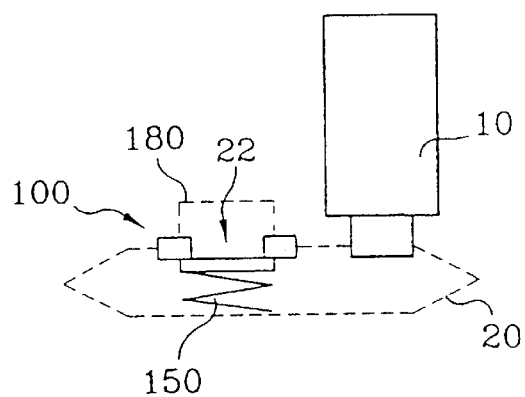
FIG. 2 is a diagrammatic view of a pump system of the present invention, in normal, non-clogged operation.
Figure 3:
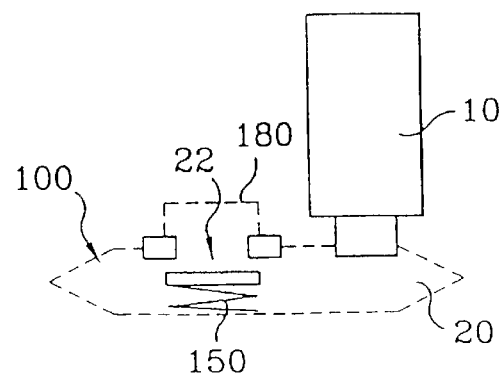
FIG. 3 is a similar diagrammatic view of the same system in the clogged state.
Figure 4:
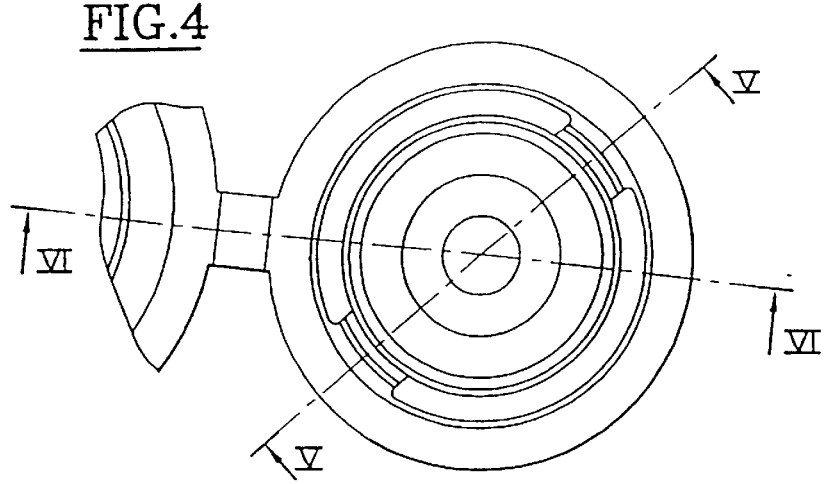
FIG. 4 is a plan view of a valve in accordance with the present invention.

In accompanying FIGS. 2 and 3, there can be seen a pump assembly comprising an electric pump 10 associated with a strainer 20 that forms a filter at the intake of the pump 10.

The strainer 20 is formed by a bag connected via an opening to the intake of the pump 10.

Typically, the mesh size of the strainer 20 is about 70 $\mu$m.

Also, as mentioned above, in the context of the present invention, the strainer 20 possess a passage 22 suitable for establishing a fluid connection between its inside volume and the outside, i.e. the internal chamber of the tank which houses such a pump assembly. This passage 22 is formed through the top wall of the strainer 20 so as to avoid being polluted by impurities that accumulate in the bottom of the tank.

However, the passage 22 is fitted with a valve 100 under drive from a spring 150 urging it into the closed position where it covers the passage 22, as shown in FIG. 2.

As shown in the accompanying figures, an auxiliary filter 180 is placed upstream from the valve, i.e. on the outside thereof. The auxiliary filter 180 has a mesh of dimensions greater than that of the strainer. Typically the mesh of the auxiliary filter 180 has a size of about 200 $\mu$m to 300 $\mu$m.

In the event of clogging due to paraffin wax or to pollution, the suction established inside the strainer 20 by the pump 10 causes the valve 100 to open, thereby enabling the pump 10 to be fed, as shown in FIG. 3.

However, the time during which the valve is open is limited. The valve 100 is automatically returned to its closed position by the spring 150 as soon as the clogging of the strainer 20 is eliminated by the recirculation of heated fuel returned from the engine to the tank.

Thus, the risk of the pump 10 becoming polluted or damaged while the valve 100 is open is small. Furthermore, the auxiliary filter 180 also puts a limit on the size of particles that can penetrate into the strainer 20 while the valve 100 is open.

The structure of the valve corresponding to the preferred embodiment as shown in accompanying FIGS. 4 to 8 is described in greater detail below.

In this embodiment, the valve 100 essentially comprises a rigid cage 110, a shutter member 130, and a spring 150.

The cage 110 is in the form of a body centered on a vertical axis.

Figure 5:
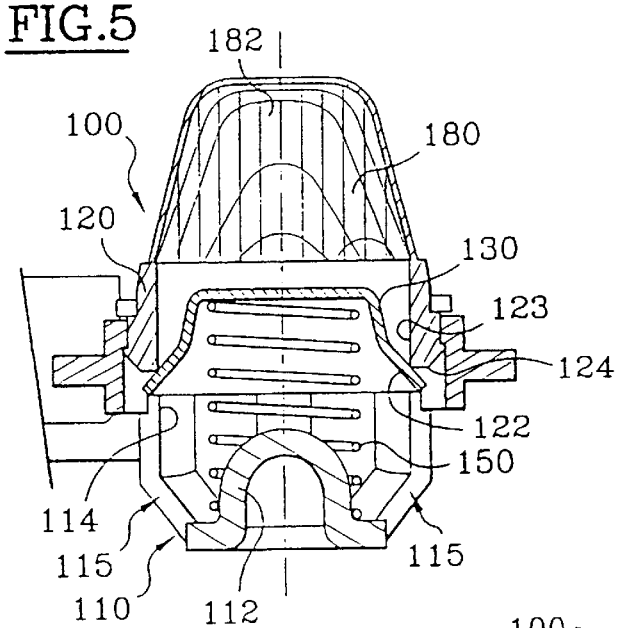
FIG. 5 is a first vertical section view of the valve on the section plane referenced V—V in FIG. 4.

The cage 110 is designed to be placed in the strainer 20. It has a bottom base 112 in the form of a generally hemispherical central cap that is upwardly convex. The cap 112 preferably rests against the wall constituting the bottom portion of the strainer 20. The cap 112 is surmounted by a vertical skirt 114. The skirt is hollowed out in its periphery to form a plurality of openings 115 as can be seen in FIG. 5, so as to provide communication between the inside of the cage and the inside of the strainer 20.

In its top portion, the cage 110 defines a seat 122 for the shutter member 130.

More precisely, the above-mentioned seat 122 is preferably formed by a ring 120 fitted to the top portion of the cage 110.

The ring 120 preferably also defines a circular angular seat 122 projecting into the inside of the cage 110.

More precisely, this seat 122 is preferably defined firstly by a vertical cylindrical wall 123 and secondly by a plane ring-shaped wall 124 extending perpendicularly to the above-mentioned surface 123. The seat 122 is defined by the intersection between the two surfaces 123 and 124.

The shutter member 130 is in the form of a cup whose concave side faces downwards. This cup has a top cap defined by a cylindrical surface 132 whose top portion is closed by a transverse partition 134 and it is extended at its base by a frustoconical skirt 136 that flares away from the partition 134.

Figure 6:
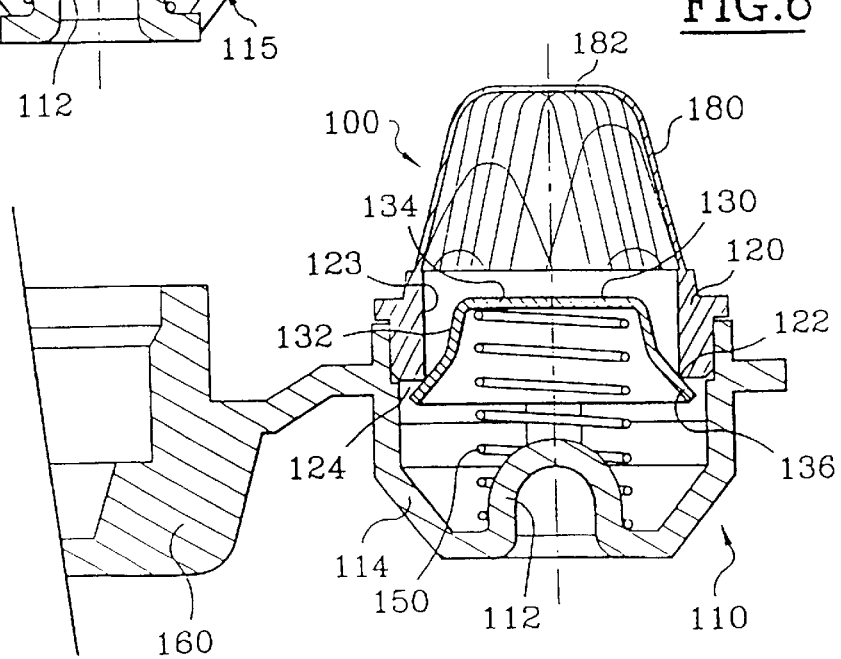
FIG. 6 is a second vertical section view of the same valve on the section plane referenced VI—VI in FIG. 4.
Figure 8:
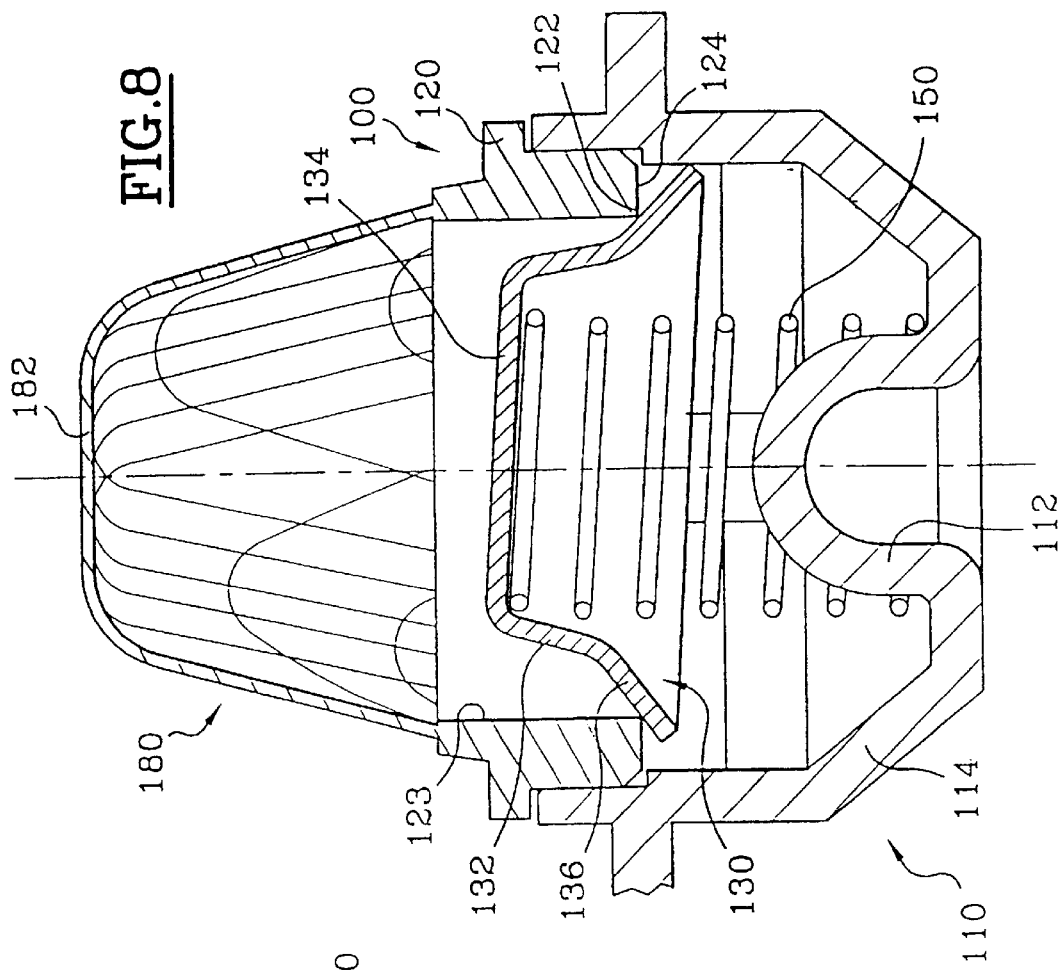
FIG. 8 is a vertical section view of the valve, similar to FIG. 5, with the shutter member of the valve in an inclined position.
Figure 10:
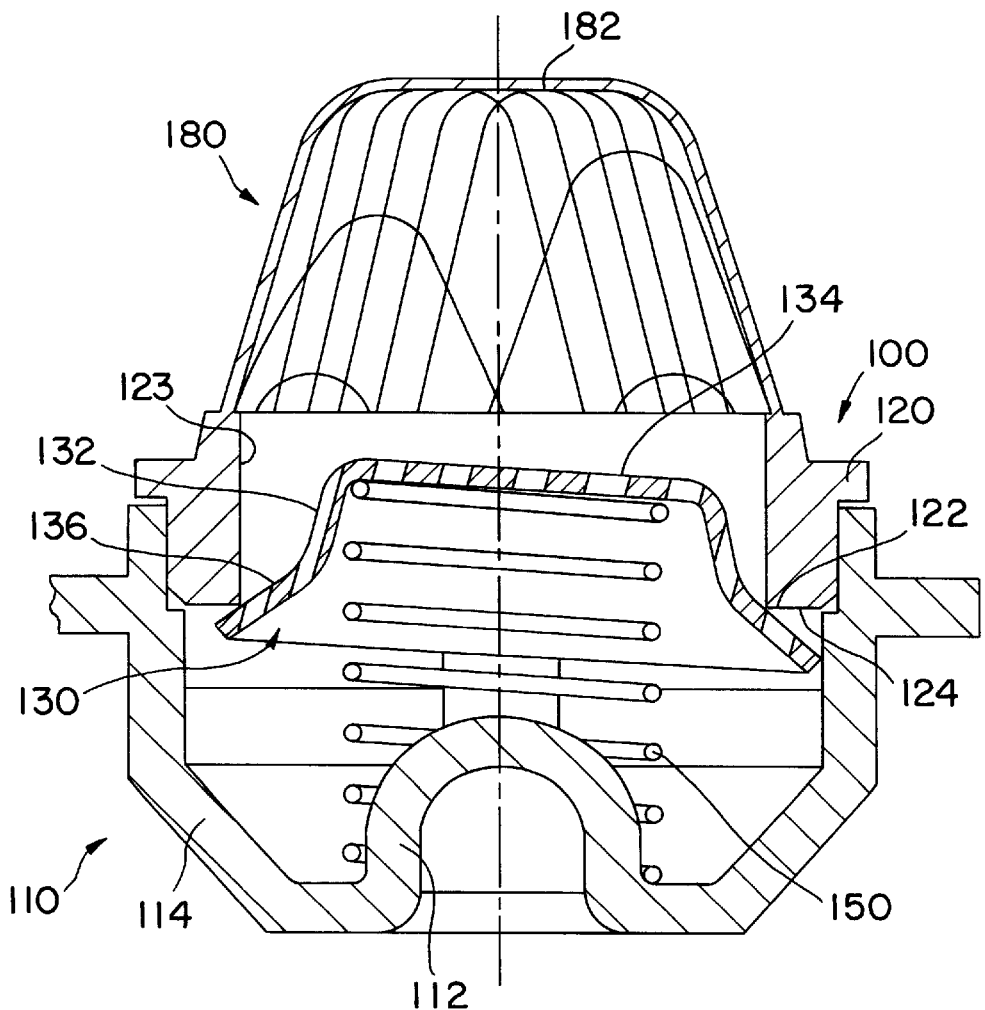
FIG. 10 is a view similar to FIG. 8 wherein the shutter member of the valve is formed by a filter element.

As mentioned above, the partition 134 of the shutter member is preferably solid and fuel-proof as illustrated in FIGS. 5, 6 and 8. However in a variant it can be formed in part by a filter element having a mesh with the same dimensions as the mesh of the strainer as illustrated in FIG. 10.

The radius of the edge 122 forming the seat lies between the small radius and the large radius of the frustoconical skirt 136. Thus, the cup 130 rests on the seat 122 via its frustoconical skirt 136.

The shutter member 130 is urged into this position by the spring 150.

In the embodiment shown in the accompanying figures, the spring 150 is a spiral spring interposed between the base 112 and the top partition 134 of the cup 130.

However such a spiral spring 150 could be replaced by any equivalent means.

The auxiliary filter 180 surmounts the ring 120 that forms the seat 122. Where appropriate, the auxiliary filter 180 can be an integral portion of said ring 120 or can be fixed thereto by any appropriate means.

The auxiliary filter 180 is generally frustoconical in shape, tapering upwards and closed at its top end by a curved wall 182.

The cage 110 is preferably secured to a base 160 adapted to provide a leakproof connection with the intake of the pump 10. The structure of the base 160 can be implemented in numerous ways depending on the intake configuration of the pump 10 and is not described in greater detail below.

The connection between the edge of the cage 110 and the filter wall forming the strainer 20 can be provided by any suitable means, e.g. by adhesive or by welding.

It will be observed that by making the seat 122 in the form of a cylindrical edge projecting into the inside of the cage 110, it is possible to guarantee that the valve closes properly, even if particles have penetrated into the cage while the valve 100 was open.

Furthermore, this disposition makes it possible to guarantee that the valve 100 closes in satisfactory manner, even when the seat 122 and the shutter member 130 are not coaxial. Thus, the valve 100 as shown in FIG. 8 has its shutter member 130 in a tilted position.

Figure 7:
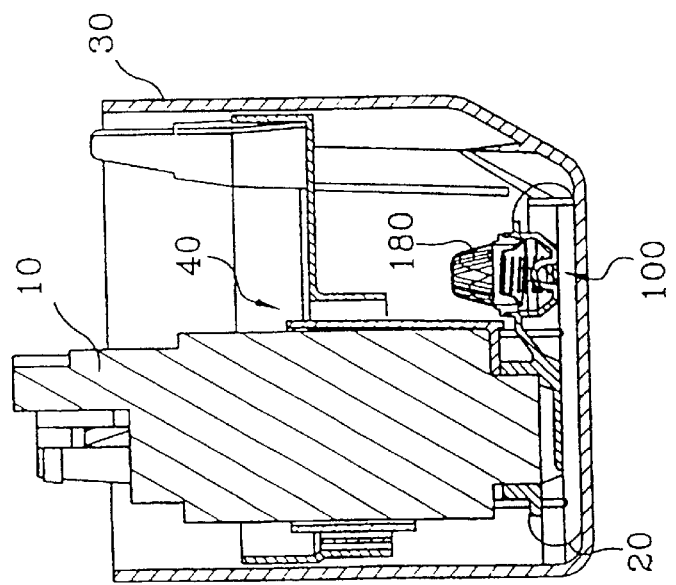
FIG. 7 is a vertical section view of a pump assembly in accordance with the present invention.

FIG. 7 shows the pump 10 supported in a reserve bowl 30 via damper means 40.

It will be observed that the cage 110 can be used as a spacer between the top wall and the bottom wall constituting the strainer 20.

Naturally, the present invention is not limited to the embodiment described above, but extends to any variant coming within its spirit.

Figure 9:
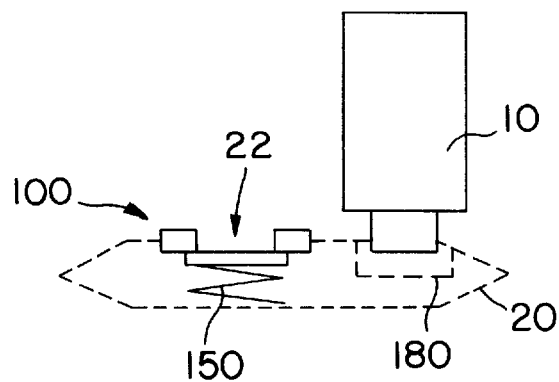
FIG. 9 is a view similar to FIG. 2 corresponding to an embodiment of the invention wherein the strainer is placed at the intake of the pump.

Thus, by way of example, in a variant the auxiliary filter 180 placed upstream from the valve 100 in the embodiment shown in FIGS. 2 to 8 could be placed at the intake of pump 10 inside the strainer 20 as illustrated in FIG. 9. This disposition makes it possible to draw benefit from the operating temperature of the pump 10, thereby limiting the risk of the auxiliary filter 180 itself becoming clogged.

What is claimed is:

1. A pump device for a gas oil tank of a motor vehicle, the device comprising:

a pump (10);

a filtering strainer (20) placed at the intake of the pump (10); and a valve (100) disposed in a passage (22) formed through the strainer (20) so as to close said passage (22) in normal operation, the valve (100) being adapted to open automatically when the pressure difference between the outside of the strainer (20) and the inside thereof exceeds a threshold because of the strainer (20) becoming clogged, wherein a seat (122) of the valve is angular and projects into the inside of a cage (110) of the valve.

2. A device according to claim 1, wherein the strainer (20) possesses a mesh having a size of about 70 μm.

3. A device according to claim 1 or 2, wherein the valve (100) is protected by an auxiliary filter (180) having a mesh larger than 200 μm.

4. A device according to claim 1 or 2, wherein an auxiliary filter (180) of mesh size greater than 200 μm is placed at the intake of the pump (10).

5. A device according to claim 1 wherein the strainer (20) is in the form of a bag connected via an opening to the intake of the pump (10).

6. A device according to claim 1, wherein the passage (22) is formed through the top wall of the strainer (20).

7. A device according to claim 1, wherein the valve (100) includes a cage (110) formed by a body centered on a vertical axis, designed to be placed inside the strainer (20), possessing a bottom base (112) in the form of a generally hemispherical central cap that is upwardly convex, and surmounted by a vertical skirt (114) that flares at its periphery in the form of a plurality of openings (115) so as to allow communication between the inside of the cage and the inside of the strainer (20).

8. A device according to claim 7, wherein a top portion of the cage (11) defines the seat (122) for a shutter member (130) of the valve.

9. A device according to claim 8, wherein the seat (122) is formed by a ring (120) fitted to the top portion of the cage (110).

10. A device according to claim 1, wherein the seat (122) is defined firstly by a vertical cylindrical wall (123) and secondly by a ring-shaped plane wall (124) perpendicular to the above-specified surface (123).

11. A device according to claim 1, wherein the shutter member (130) of the valve is formed by a cup with its concave side directed downwards.

12. A device according to claim 11, wherein the cup (130) has a top cap defined by a cylindrical surface (132) that is closed at its top end by a transverse partition (134) and that is extended at its base by a frustoconical skirt (136) that flares going away from the partition (134).

13. A device according to claim 12, wherein the radius of the seat-forming edge (122) lies between a small radius and a large radius of the frustoconical skirt (136).

14. A device according to claim 7, wherein the cage (110) of the valve serves a spacer between a top wall and a bottom wall of the strainer (20).

15. A device according to claim 1, wherein the valve (100) includes a shutter member formed by a gasoil-proof flap.

16. A device according to claim 1, wherein the valve (100) includes a shutter member formed by a portion of a filter element.

17. A gas oil tank for a motor vehicle, the tank comprising:

a pump (10);

a filtering strainer (20) placed at the intake of the pump (10); and a valve (100) disposed in a passage (22) formed through the strainer (20) so as to close said passage (22) in normal operation, the valve (100) being adapted to open automatically when the pressure difference between the outside of the strainer (20) and the inside thereof exceeds a threshold because of the strainer (20) becoming clogged, wherein a seat (122) of the valve is angular and projects into the inside of a cage (110) of the valve.

* * * * *